March 18, 1952 E. J. SPERBER Re. 23,474
RADIO RECEIVER SEQUENCE TUNER
Original Filed April 9, 1946 4 Sheets-Sheet 1
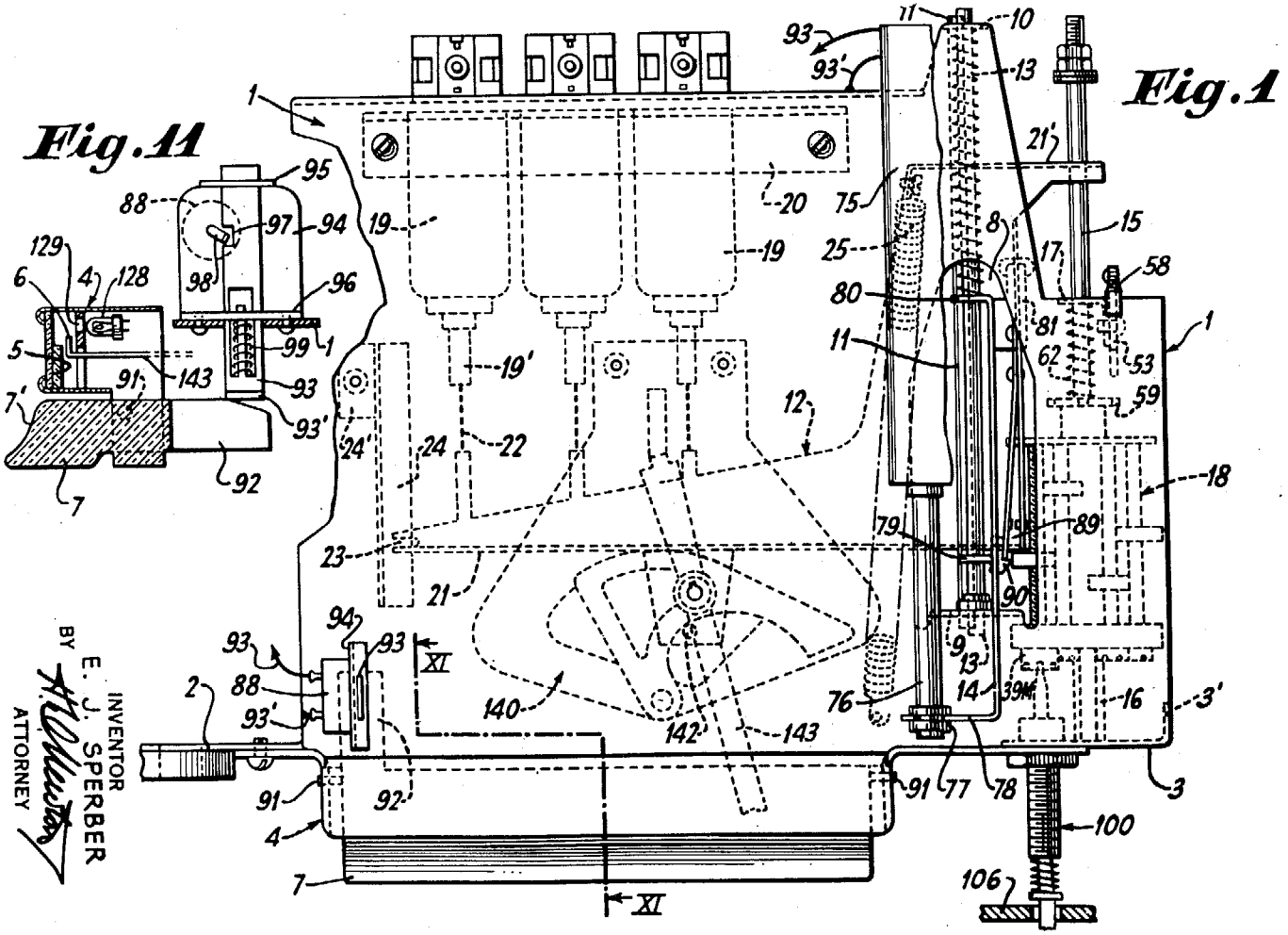
INVENTOR
E. J. SPERBER
BY H. C. Newton
ATTORNEY

RADIO RECEIVER SEQUENCE TUNER

Original Filed April 9, 1946 4 Sheets-Sheet 2

INVENTOR
E. J. SPERBER
BY H. O. Merston
ATTORNEY

March 18, 1952 E. J. SPERBER Re. 23,474

RADIO RECEIVER SEQUENCE TUNER

Original Filed April 9, 1946 4 Sheets-Sheet 3

INVENTOR
E. J. SPERBER
BY H. L. Newton
ATTORNEY

RADIO RECEIVER SEQUENCE TUNER

Original Filed April 9, 1946 4 Sheets-Sheet 4

INVENTOR
E. J. SPERBER
BY H. C. Newton
ATTORNEY

Reissued Mar. 18, 1952

Re. 23,474

UNITED STATES PATENT OFFICE 23,474

RADIO RECEIVER SEQUENCE TUNER

Edward J. Sperber, Philadelphia, Pa., assignor to Radio Corporation of America, a corporation of Delaware Original No. 2,511,602, dated June 13, 1950, Serial No. 660,598, April 9, 1946. Application for reissue January 26, 1951, Serial No. 208,091

26 Claims. (Cl. 250—20)

Matter enclosed in heavy brackets [ ] appears in the original patent but forms no part of this reissue specification; matter printed in italics indicates the additions made by reissue.

The present invention relates generally to automatic tuning mechanism for radio receivers, and more particularly to an automatic tuner of the sequence type in which a series of predetermined broadcasting stations to which the tuner is adjustably set in advance are successively and automatically tuned-in by actuation of a single control member.

One of the objects of the invention is to provide a relatively simple, compact tuner of the type above mentioned which, although not limited thereto, is capable of use in automobile receivers because of its compactness and also because its source of operating energy may be the car battery or other low-voltage source.

A further object of the invention is to provide a rotatable turret of novel design which serves as the position-determining mechanism for the receiver tuning elements, and novel means for effecting a step-by-step rotation of the turret during each cycle of operation of the tuner.

A still further object of the invention is to provide a manually-operated device in conjunction with the turret which is adapted to serve both as a manual tuning means for the receiver and as the adjusting means for setting-up in advance the broadcasting stations desired to be automatically tuned-in.

A more specific object of the invention is to provide in combination, an adjustable radio tuning element, a reciprocable carrier for said tuning element, a multi-position rotatable turret provided with a plurality of stops, one for each turret position, said stops being individually adjustable axially of the turret each to a position which determines a particular setting to which the tuning element is actuable, actuating mechanism operable upon each actuation to withdraw the carrier from a previously adjusted setting and to impart linear motion to the turret, means for converting the linear motion of the turret to rotary motion whereby the turret is stepped to a next position whereat the stop corresponding thereto is made effective, and means operative to return the tuning element carrier in abutting relation against the said effective stop whereby the tuning element is adjusted to the setting corresponding to said stop.

These and other objects of the invention and the various features and details of the construction and operation thereof are hereinafter fully set forth and described and shown in the accompanying drawings, in which:

Fig. 1 is a top plan view of the tuner according to the invention;

Fig. 2 is a front elevational view of the tuner shown in Fig. 1, with the front plate removed;

Fig. 8a is a partial view of the front end of the turret, showing the cooperative relation therewith of a combined guide and switch arm when the turret is in the forward position shown in Fig. 7a;

Fig. 9a is a bottom view of the index plate, with a turret projection resting within the indexing slot thereof, when the turret is in the forward position shown in Fig. 7a;

Fig. 11 is a cross-sectional view taken on the line XI—XI in Fig. 1; and

Briefly, the sequence tuning mechanism of the invention consists of a slidable carriage to which the tuning element (or elements) of a radio receiver is attached, a multi-position rotatable turret provided with a plurality of axially-adjustable stops, one for each turret position, and actuating mechanism which, upon each operation thereof, actuates the tuning-element carriage and the turret in timed relation so that first the carriage is withdrawn from the turret-stop which was effective at a previous tuned-in operation, after which the turret is stepped to the next angular position to bring the stop corresponding thereto into operative position, and thereafter the carriage is returned to abut against said latter stop, whereat the tuning element (or elements) is adjustably set to tune the receiver to a new predetermined carrier-frequency.

According to the present embodiment the turret is capable of angular adjustment to six positions, five of which are utilized to automatically tune the receiver to predetermined carrier-frequencies assigned to the stations which are most frequently heard, and the sixth position is utilized to effect tuning of the receiver through its entire frequency range by means of a manual tuning control member arranged to cooperate with the turret-stop corresponding to said sixth turret position. A solenoid under control of a manually-operated switch is the actuating means for causing, with the aid of a pivoted lever coacting with an index wheel affixed to the turret, rotation of the turret to successive positions of angular adjustment.

For a detailed description of the tuning mechanism and its manner of operation, reference will now be made to the drawings.

Figure 3:
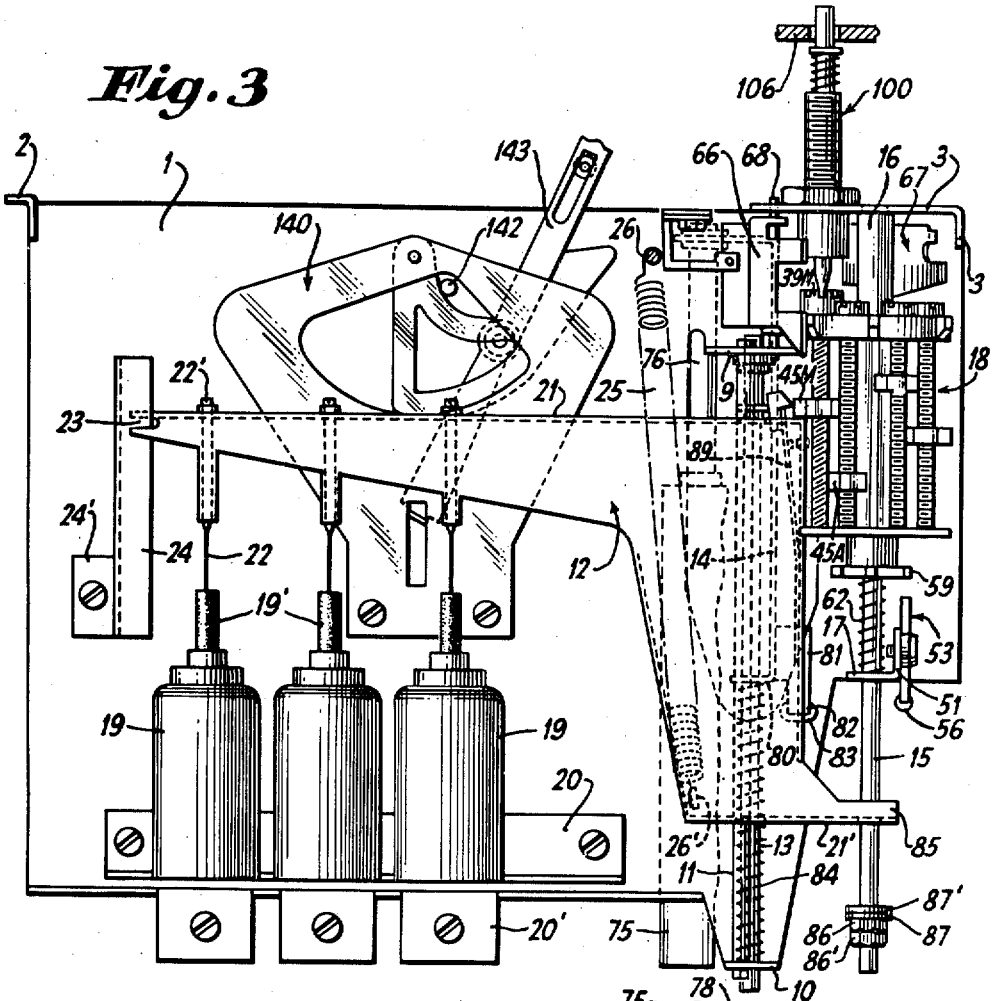
Fig. 3 is a bottom view of Fig. 2.

Referring first to Figs. 1, 2 and 3, there is shown at 1 a main supporting plate or frame member provided at the left with a mounting bracket 2 and at the right with a bracket 3 bent at right angles to a depending side piece 3' of the frame 1 (Fig. 1). Extending between and supported from brackets 2 and 3 is a rectangular housing 4 within which (see Fig. 11) there is located a scale member 5 and an indicator pointer 6, and which carries also a manually-actuated rocker-bar 7 utilized to initiate the automatic operation of the tuning mechanism.

The frame 1 has formed therein an elongated aperture 8 at the forward end of which, bent at right angles to and depending from the frame, is a bracket 9 (Figs. 1 and 2). Also bent at right angles to and depending from the frame at the rear is a second bracket 10 aligned with the bracket 9. Journaled within aligned holes in the respective brackets 9 and 10 is a shaft 11 on which a core carriage, shown generally at 12, is adapted to slide. Also journalled within aligned holes in the same brackets and disposed above and in parallel relation to the carriage shaft 11 is a second shaft 13 (see Fig. 2) on which there is adapted to slide a solenoid-actuated arm 14 for moving the carriage. A third shaft 15 is disposed in parallel relation to shafts 11 and 13 and has its forward end journalled in a bushing 16 carried by the bracket 3 and its rear end journalled in a hole formed in a bracket 17 which is bent at right angles to and depends from the frame member at the rear in line with the bushing 16. The shaft 15 at its forward end carries a turret, shown generally at 18, and both the shaft and turret are capable of limited axial movement for a purpose hereinafter to be described.

The tuning element of the receiver, shown here as of the type known as a permeability tuner, comprises a plurality of tuning coils (not shown), each housed in a shield can 19, and a plurality of magnetic cores 19', each movable within its respective coil, the axial adjustment of the cores with respect to their coils determining the tuning adjustment of the receiver. The several shield cans are suitably supported on a depending bracket 20 fastened to frame 1 at the rear, said bracket also supporting a number of trimmer condensers 20' on tabs 20'' which extend at right angles from the main body of bracket 20.

The core carriage 12, previously mentioned, is provided with a front transverse member 21, to which the magnetic tuning cores 19' are attached through the medium of connecting wires 22 and adjusting screws 22', and with a rear transverse member 21' (Fig. 3). The two transverse members 21 and 21' are provided with aligned holes through which the shaft 11 extends, and the member 21 is provided at the left (Figs. 2 and 3) with a slit or groove 23 which is adapted to receive a ledge 24 of a bracket 24' affixed to the underside of frame member 1, the ledge 24 and shaft 11 serving as a pair of rails on which the core-supporting carriage is adapted to be reciprocated. A tension spring 25, having one end attached to the frame at 26 and its other end to the carriage at 26' serves to urge the carriage in a forward direction, the position shown in Fig. 1.

Figure 4:
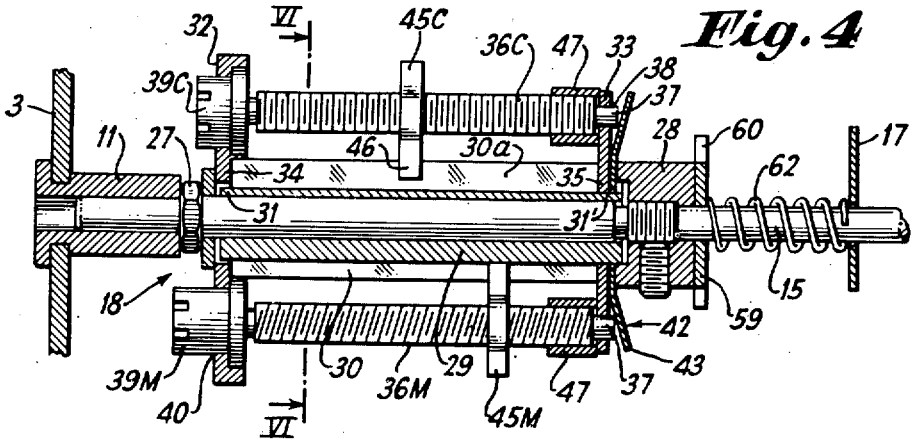
Fig. 4 is a view, in cross-section and on an enlarged scale, of the turret assembly.
Figure 5:
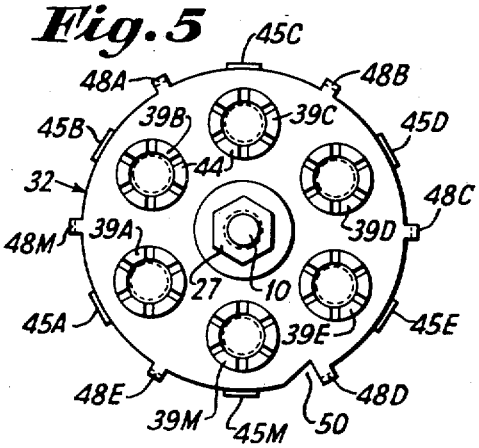
Fig. 5 is an end view of Fig. 4 looking from the left in Fig. 4.
Figure 6:
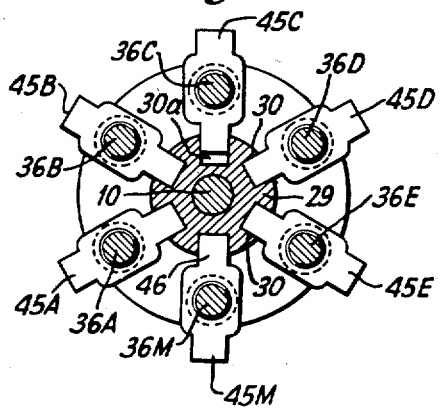
Fig. 6 is a cross-sectional view taken on the line VI—VI in Fig. 4.

In order that the assembly of the slidable carriage and tuning cores may be stopped automatically at predetermined positions of adjustment there is provided the turret 18, previously mentioned. The turret and its shaft are shown in detail in Figs. 4, 5 and 6. In these figures the turret is shown in an intermediate position between its two limits of travel, the position whereat the manual screw-shaft, hereinafter referred to, is lowermost and in vertical alignment with the turret shaft. On the latter shaft, between a pair of nuts 27 and 28 which are threaded thereon in spaced relation, is mounted an elongated hub or guide member 29 provided with six equi-angularly spaced grooves 30 which extend in the direction of the shaft. The opposite ends 31, 31' of the guide 29 are of reduced diameter to provide bearing surfaces for front and rear end plates 32 and 33. As shown in Fig. 6, one of the grooves designated 30a is undercut below the others and, unlike the others, extends through the end bearing surfaces 31 and 31' to provide key-ways which are adapted to receive locking keys 34 and 35 formed on the respective end-plates to prevent rotation thereof with respect to the hub or guide member.

Extending between the two end plates 32, 33 near their peripheries and equi-angularly spaced are six lead-screws 36A to 36E and 36M which are provided each at its rear end with a reduced bearing portion 37 journalled within a hole 38 formed in the rear end-plate. The lead-screws are provided at their forward ends with heads 39A to 39E and 39M, respectively, which extend through and are journalled at their bases within countersunk holes 40 formed in the front end-plate. A spring plate 42, also keyed to the guide member at its rear end, is clamped at the center between nut 28 and rear end-plate 33. The spring plate is provided with six radially-extending fingers 43 which coact each with the bearing portion 37 of a lead-screw to spring-press the same in a forward direction. The screw-heads 39 are provided with radial slots 44 adapted to be engaged by a manually-operated key, later to be described, and all the screw-heads are of the same length except the one designated 39M, utilized to effect manual tuning, which is made somewhat longer.

Threaded on the lead-screws are stop-nuts, designated 45A to 45E and 45M to correspond with their respective lead-screws. In order to permit of individual axial adjustment of the stop-nuts, which have the configuration shown in Fig. 6, their reduced portions 46 are disposed within their respective grooves 30 and 30a in the hub or guide member 29 so that upon rotation of a lead-screw, its stop-nut is restrained from rotation with respect to the lead-screw but is permitted to move axially within its groove. Fitted over the several screws at the rear thereof are tubular fibre spacers 47 which are adapted to limit the range of stop-nut adjustment. The front plate 32 is also keyed to the guide member and is provided around its periphery with six equi-angularly spaced projections which are designated 48A to 48E and 48M. Each of said projections is equidistantly spaced between a pair of adjacent lead-screws.

For convenience, the same designations A to E and M have been applied to the various projections 48 and stop-nuts 45 which at any given time are effective in bringing about a predetermined adjustment of the tuner. For example, the stop-nut and projection that are effective during the cycle of operation to actuate the turret to its manual tuning position shown in Figs. 2 and 3, are designated 45M and 48M, respectively. These elements, it will be noted, are spaced 90° apart as are also corresponding pairs of the remaining stop-nuts and projections as, for example, stop-nut 45A and projection 48A, stop-nut 45B and projection 48B, etc.

The periphery of front plate 32 is also provided with a cam notch or cut-out 50 for a purpose to be explained later. In assembling the turrent, plate 32 is oriented on and keyed to the turret shaft so that the cam notch 50 is disposed next adjacent the longer screw-head 39M, that is, to the right thereof as viewed in Fig. 5.

During a cycle of operation the turret assembly as a unit is actuated rearwardly in an axial direction from an initial position to a limiting position, after which it is returned by spring means in the opposite or forward direction to its initial position of rest. During this rearward travel of the turret assembly, the linear movement thereof is converted to one of rotation through an angle of 60°, which it will be remembered, is the angular distance between adjacent pairs of circularly-arranged turret-screws and stop-nuts. The means for effecting this stepping action of the turret during each cycle of operation will now be described with reference to Figs. 7a and 7b.

The bracket 17 within which the turret shaft 15 is slidably mounted is provided with an integral ear 51 bent at right angles to and disposed in spaced parallel relation with respect to the shaft. Pivotally mounted on ear 51 by means of a rivet 52 is a lever 53 having the configuration shown in Fig. 7a. The lever is adapted to be rocked between the two limiting positions shown in Figs. 7a and 7b. In the first position (Fig. 7a) a shoulder 54 on the lever coacts with the rear side of a portion of the bracket 17 disposed in the plane of the lever, and in the second position (Fig. 7b) a second shoulder 55 on the lever coacts with the front side of said bracket portion. The lever is urged to the former position by means of a coil spring 56 which is anchored at one end to the lever at 57 and at the other end to a suitable support 58 overhanging the lever and affixed to the frame 1.

Figure 10:
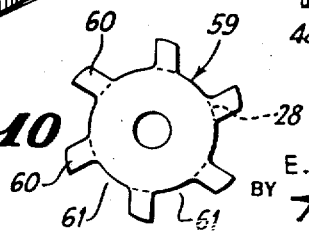
Fig. 10 is a face view of the index wheel.

Attached to the lock-nut 28 at the rear of the turret assembly by suitable means is an index wheel 59, a front or face view of which is shown in Fig. 10. The index wheel has the configuration shown, being provided with as many spokes 60 and spaces 61 as there are turret positions. A coil spring 62 encircles the turret shaft 15 and is disposed between the index wheel 59 and the bracket 17. The spring urges the turret to the forward position shown in Fig. 7a, and in that position the pivoted lever 53 is spaced from the index wheel and assumes the position in which a forwardly extending nose 63 points downwardly at an angle to the shaft axis.

Figure 7A:
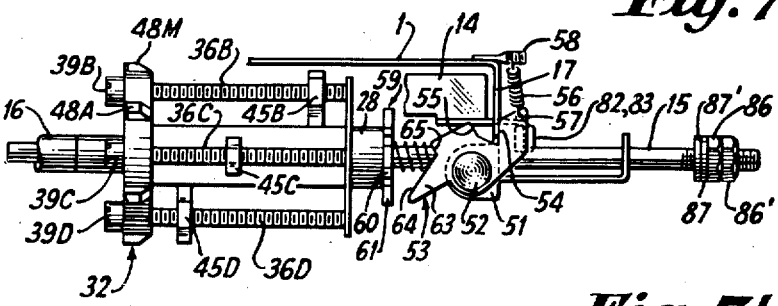
Fig. 7a is a fragmentary side view of the turret and related parts, looking from the right in Fig. 1, showing the turret in its forward, rest position whereat the tuner is set to one of its predetermined adjustments.
Figure 7B:
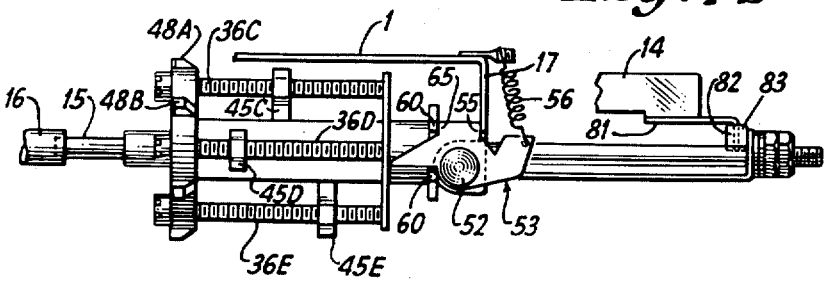
Fig. 7b is a view similar to Fig. 7a, showing the turret after being moved rearwardly to its limiting position and stepped to its next angular setting.

Upon actuation of the turret in a rearward direction, by means later to be described, the turret is moved linearly until the particular spoke 60, which happens to be in the path of the nose, strikes the upwardly inclined edge 64 of the nose 63. With continued movement of the turret the spoke rides up on the nose edge, the turret now having commenced its rotation, until it coacts with a shoulder 65 on the lever, whereupon continued movement of the turret causes the lever to be rocked about its pivot 52, in opposition to action of spring 56, to the limiting position shown in Fig. 7b. Rotation of the turret, which is in a counter-clockwise direction when viewed from the left in Fig. 7a, occurs initially during the interval that the wheel spoke travels up the nose incline. This initial turret rotation does not produce any turning movement on the lever because the force applied to the lever by the moving turret is mainly in the direction of its pivotal point and also because of the slight friction existing between the spoke and the incline. However, upon the spoke abutting against shoulder 65, a turning moment is applied to the lever causing the same to be rocked to its limiting position shown in Fig. 7b and permitting the turret to complete its full rotation of 60°. At this instant the turret has also reached its limit of linear travel and, as shown in Fig. 7b, the nose of the lever is firmly seated in the space between a pair of adjacent spokes 60 so that the turret is properly indexed at the new angular position of adjustment.

Figure 8A:
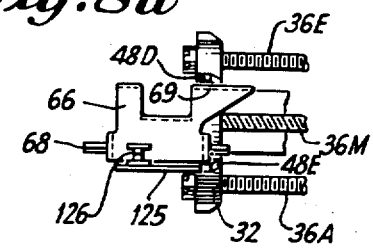
Figure 8B:
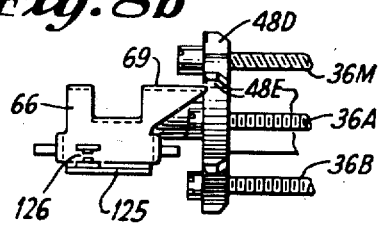
Fig. 8b is a view similar to Fig. 8a showing the cooperative relation of the same parts when the turret is in the rear limiting position shown in Fig. 7b.

In order that the turret may retain this angular adjustment during its return travel and also as its forward rest position, there are provided a pivoted guide arm, shown generally at 66 in Figs. 2 and 3, and a guide plate, shown generally at 67 in Fig. 2. As best shown in Fig. 3, the pivoted arm 66 is mounted on a stud shaft 68 which is disposed in parallel relation to the other shafts mentioned above and is journalled within and between the brackets 3 and 9. By means of a spring (not shown) the arm is urged against the periphery of the turret end-plate 32. In the forward position of the turret shown in Fig. 8a the upper edge 69 of the arm rests underneath and in abutting relation with a projection which in the assumed case happens to be 48D. During the initial rearward travel of the turret, the projection 48D will ride on said arm edge part of the way until the turret commences to rotate when the projection will back away from the edge. At the limiting position of the turret shown in Fig. 8b, the turret has already been stepped to its next angular position as explained above, and the next projection 48E after camming the arm out of its path will locate itself on edge 69 as shown in Fig. 8b. With forward travel of the turret from the position in Fig. 8b to that in Fig. 8a, the projection 48E slides on the edge to thereby cause the turret to retain its new angular adjustment.

Figure 9A:
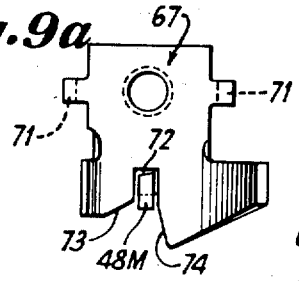
Figure 9B:
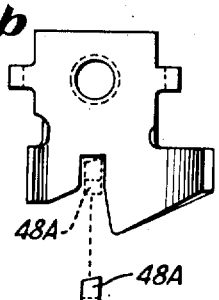
Fig. 9b is a view similar to Fig. 9a, showing the relation of the same parts, when the turret is in the rear limiting position shown in Fig. 7b.

As a further precaution to assure proper indexing of the turret at its forward rest position, there is positioned underneath frame 1 and in overlying relation with respect to the front of the turret (see Fig. 2) the previously mentioned guide or index plate 67. The plate is held in position by means of a screw 70 and a pair of lugs 71 which fit into a pair of similarly-shaped openings in the frame. The plate is also provided with an open-ended slot 72 (Figs. 9a and 9b), the side edges of which are flared outwardly at 73 and 74. In the forward or rest position of the turret as shown in Figs. 7a, the uppermost projection 48M will be retained in the slot and is so shown in Fig. 9a. The turret will then be properly indexed for manual tuning. Fig. 9b shows the aligned position with the slot of the next projection 48A at the turret limiting position shown in Fig. 7b. As explained above in connection with Figs. 8a and 8b, during the return movement of the turret under the action of coil spring 62, the arm 66 will guide the turret during at least part of its travel. However, when the projection 48A reaches the area between the flared edges 73 and 74, the guide plate takes over and guides the turret to its properly indexed position. The guide plate just described is particularly effective when the tuning mechanism of the invention is applied to automobile receivers which are subject to considerable vibration and shock. Any tendency of the turret to return to its newly adjusted position in a direction other than a true linear direction will therefore be prevented by the guide arm and index plate above described.

The sole actuating device for the radio tuner is a solenoid mechanism, the functions of which are to drive the turret from its forward rest position to its rear limiting position as described above, and to move the tuning-core carriage also from a rest position to a limiting position. The solenoid, shown at 75 (Figs. 1, 2 and 3), is bolted to the frame, its armature or plunger 76 extending in parallelism with the several shafts 11, 13 and 15. The outer end of the plunger is provided with a reduced portion (not shown) which is adapted to receive a grommet 77 having a circular groove formed therein. This groove is adapted to receive a forked end 78 of the previously mentioned carriage actuator arm 14 which extends along and in parallel spaced relation with the shaft 13. The actuator arm, which is adapted for sliding movement on the shaft, is provided with a pair of apertured ears 79 and 80 bent at right angles thereto through which the shaft 13 passes. The arm is also provided at the rear with a side piece 81 which terminates in a depending part 82 around which there is firmly fitted a sleeve 83 of rubber or other shock-proof substance. The arm part 82 is disposed in front of and in the plane of the rear transverse member 21′ of the core-carriage so that upon actuation of the arm, with energization of the solenoid, it coacts with member 21′ to move the core-carriage in a rearward direction. A coil spring 84 is disposed around shaft 13 between the bracket 10, which receives one end of the shaft, and the ear 80 of the actuator arm to urge the armature in a forward direction when the solenoid is in the deenergized state.

Although the actuator arm 14 has been described as being actuated by electrical means, such as the solenoid 75, it will be understood by those skilled in the art that mechanical means may be employed equally as well for accomplishing the desired result. For example, by means of a suitable system of links associated with the actuator arm and actuated by a simple manual push-button, the necessary motive force may be applied to the actuator arm to operate the tuning mechanism of the invention herein described.

The force for imparting the rearward movement to the turret is tansmitted by the actuator arm 14 through a lateral extension 85 of the carriage transverse member 21′ which is apertured to receive the turret shaft 15. Adapted to cooperate with said lateral extension is a nut and washer assembly carried on the outer end of the turret shaft, said assembly comprising a nut 86 and a lock-nut 86′, which are threaded on the shaft, and a metal washer 87 and a felt washer 87′.

The complete cycle of operation of the tuning mechanism will now be described. Let it be assumed that at the beginning of this cycle the parts are arranged as shown in Figs. 2 and 3, that is, with the turret positioned for manual tuning; with the core-carriage stopped in a tuned position determined by the stop-nut 45M against which the right-hand corner of the carriage abuts; and with the actuator arm 14 in its forwardmost position due to the solenoid being deenergized. The turret, core-carriage and actuator arm are retained in their respective positions mentioned above by means of the springs 62, 25 and 84, respectively.

Operation of the tuning mechanism to effect adjustment of the tuner to the next position in the sequence is initiated by closure of a switch 88 mounted on the frame behind the scale housing 5 and connected in circuit with the solenoid 75. Upon energization of the latter, plunger 76 is pulled into its winding or, as viewed in Fig. 3, in a rearward direction, carrying with it the actuator arm 14 in opposition to action of spring 84. No useful function is peformed during the initial travel of the actuator arm until its extension 82—83 reaches the carriage transverse member 21′. Further travel of the actuator arm results in the core-carriage being withdrawn from its stop-nut 45M in opposition to action of spring 25, and still further travel of the actuator arm causes the lateral carriage-extension 85 to engage the nut and washer assembly 86′—87′ at which time the turret begins its rearward movement in opposition to action of spring 62. The final travel of the actuator arm effects movement of the turret to its limiting position shown in Fig. 7b as well as movement of the core-carriage to its most rearward position at which the tuning cores are fully entered within their respective coils. As already explained in connection with Figs. 7a and 7b, the turret assembly is rotated through 60° in a counter-clockwise direction during the rearward travel of the turret and during the course of the final travel of the actuator arm. For the case originally assumed above, the turret will be rotated one step to its next adjustment in the sequence whereat the stop-nut 45A is brought into the path of the right-hand corner of the core-carriage.

The solenoid is deenergized after the carriage and turret have reached their limiting positions, and spring 84 causes the return of actuator arm 14 to its original forward position, thus removing the driving force for the turret and core-carriage. The turret is now permitted to move forwardly under the action of spring 62 and the carriage also is permitted to move forwardly under the action of spring 25. With the return of the turret, accurately indexed in the manner already described, to its forward rest position the core-carriage returns to its new position at which it coacts with the stop-nut 45A just brought into position, and the cycle of operation is completed.

In order that the receiver may be silenced during the automatic tuning process and thus prevent the loudspeaker from blasting forth in succession the programs from many stations to which the receiver is tunable as the tuner is actuated from one position to the next successive position, a short-circuiting switch for the loudspeaker voice coil is provided. This switch designated 89 (see Figs. 1 and 2) is carried on a flange at the right side of the core-carriage. Carried at the forward end of the movable arm of said switch is a cam member 90 which is adapted in any adjusted position of the turret to cooperate with the stop-nut then effective to cause the switch to remain open. With movement of the core-carriage away from its stop-nut, at the beginning of the automatic tuning cycle, the cam member is also withdrawn from the stop-nut to cause closure of the switch which in turn short-circuits the loudspeaker voice coil. The latter remains in the short-circuited condition to almost the completion of the tuning cycle and just prior to the instant the core-carriage is returned to its new position, when the switch cam member coacts with the stop-nut to open the switch and make the loudspeaker effective.

Extending underneath the housing 4 at the front of the mechanism and pivotally mounted between the housing side walls at 91 and 91 is the manually-operated rocker-bar 7 previously mentioned which is provided with a rearwardly extending arm 92 disposed underneath and in contact with a plunger 93 for operating the solenoid switch 88. The latter is suitably connected by leads to the solenoid and is supported on a bracket 94 which is affixed to the main frame 1. The bracket is provided with upper and lower flanges 95 and 96, respectively, which are apertured to slidably receive the switch-operating plunger 93. Seated within a notch 97 at the side edge of the plunger is the free end of a switch arm 98. A spring 99 tends to urge the plunger downwardly so that a flange 93′ at its lower end rests on the rocker bar arm 92. In this state, switch arm 98 is in its open-switch position and the manually-operated part or finger piece 7′ of the rocker-bar is biased to its upper position by reason of the action of spring 99 on the plunger which coacts with the rocker-bar extension 92. With downward pressure applied to the finger piece, the rocker-bar will be rocked to force the plunger bar 93 upwardly in opposition to action of spring 99 to actuate switch arm 98 to its closed-switch position. Upon the release of the finger piece, the plunger will return to its downward position under action of its spring and returning also switch arm 98 to its open-switch position.

Figure 12:
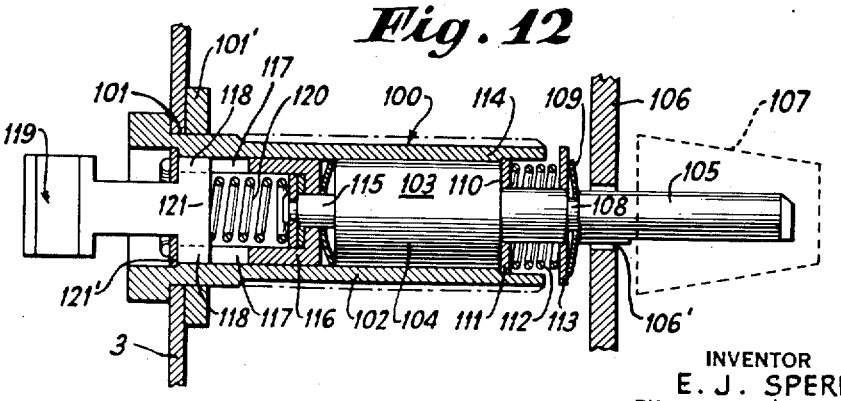
Fig. 12 is a view in cross-section and on an enlarged scale, of the manual tuning device.

In order to effect manual tuning of the receiver, when desired, and also to make the initial individual adjustments of the several stop-nuts, there is provided a manual tuning and adjusting device 100, shown generally in Figs. 1 and 3, for example, and in detail in Fig. 12. The device 100 includes a bushing 102 which extends through an aperture 101 formed within front plate 3 and is clamped thereto by means of a nut 101′ threadedly received around the bushing. As shown in Figs. 1 and 3, the device 100 is positioned to be axially aligned with the screw-head at the end of that lead-screw which at the particular instant determines the tuner adjustment. Within the bushing 102 of the device there is slidably mounted a shaft 103 having a main body portion 104 and a reduced portion 105, which is adapted to extend through an aperture 106′ in a front panel 106 and to have mounted at its outer end a manual tuning-knob 107. Spaced forwardly of the main body of the shaft is a circular groove 108 which is adapted to receive a C-washer 109, and between a shoulder 110 at the right of the main shaft body 104 and the C-washer 109 are disposed a washer 111, a coil spring 112, and a second washer 113. The washer 111 is urged by spring 112 against a shoulder 114 formed on the inner surface of the bushing 102 so that the shaft extension 105 with knob 107 is urged outwardly (to the right as seen in Fig. 12) away from shoulder 114.

At the other side of shaft 103 there is provided a reduced portion 115 which is adapted to receive the apertured end of a hollow housing 116 provided with two diametrically opposed slots 117 within which the sides 118 on a base portion 121 of a flat key 119 is adapted to be slidably fitted. The base portion 121 of the key is retained within the housing by means of a washer 121′ at the rear thereof, and a coil spring 120 is disposed within the housing between the key base portion and the shaft-supported end of the housing to permit relative movement of the key with respect to the shaft. This relative movement of the key is necessary when the turret assembly is being rotated to its manual tuning position shown in Fig. 3, where the key 119 is intended to be engaged in the slots 44 of head 39M at all times. Since the key is then in the path of the longer screw-head 39M, it is necessary that the key be free to move in an axial direction when urged to do so by the screw-head so that the latter can reach its rest position even though the key is not aligned with its slots 44. Any misalignment is rectified when the shaft 103 is rotated by knob 107, the key then dropping into the first slots across which it is moved.

The turret is shown in Figs. 1 and 3 in the manual tuning position, in which position as heretofore stated, the key 119 is engaged with the longer screw-head 39M so that depression of tuning-knob 107 is unnecessary for manual tuning. Rotation of shaft 103 by means of the tuning-knob effects axial movement of the stop-nut 45M on its lead screw 36M and concomitant travel of the core-carriage which is spring-pressed in abutting relation with stop-nut 45M.

In the manual tuning position of the turret shown in Figs. 2 and 3, the cam slot or notch 50 in the turret front plate 32 is positioned to receive the pivoted index arm 66 as previously mentioned. This index arm is provided at its opposite end with a switch actuator 125 to effect closure of a switch 126 carried by a suitably supported member 127. This switch closes a circuit for a dial light 128 (see Fig. 11) located behind an aperture 129 in a plate 130 spaced from the indicator scale 5 to visually indicate the fact that the tuner is set for manual operation.

For the purpose of initially setting-up the various stations to which it is desired that the tuner be automatically adjusted, the rocker-bar 7 is actuated to effect rotation of the turret to any one of its angular positions. The manual tuning shaft 103 is then pressed in in opposition to action of the spring 112 to force key 119 to engage the corresponding automatic tuning stop head 39A to 39E aligned therewith. The shaft in the depressed position is now rotated by knob 107 to seat the key 119 in the slots 44 on the selected stop head and cause the corresponding stop-nut to be moved in an axial direction, which in turn causes the core-carriage to move. The tuning knob is thus manipulated until the desired station is received. The knob is then released, and thereafter when the turret is again rotated to the above angular position the receiver will be automatically tuned-in to said selected station. The same procedure as above is followed for the other angular turret positions, except the one for which manual tuning is employed, so that in subsequent actuations of the manual rocker-bar the various selected stations will be automatically tuned-in and in a predetermined sequence.

It will be noted that the lead-screw 36M which serves to effect manual tuning is shown in the several figures to have a greater pitched screw-thread than the other lead-screws, 36A to E, used to effect automatic tuning. This is to provide a more rapid travel of the carriage-coacting stop-member 45M for manual tuning and a relatively slow or micrometer adjustment of the stop-nuts 45A to E for initially setting up the stop positions to which the tuner is to be automatically actuated.

A pointer mechanism for indicating the tuning core position or the frequency adjustment of the receiver, is shown generally at 140 in Figs. 1 to 3. The mechanism is supported on a bracket 141 attached to the under side of frame 1. Since this mechanism does not form a part of the present invention, further description thereof will not be given except to state that actuation thereof is accomplished by means of an upstanding pin 142 mounted on the core carriage as by means of an extending flange not shown, and that the linkage employed in the mechanism for actuating the pivoted pointer arm 143 is such that the pointer 6 at the end of said arm which extends into the housing 4 and is positioned above and behind the indicator scale (Fig. 11), is caused to travel linearly in response to linear travel of the core-carriage over its range. In other words, the pointer mechanism functions to translate the linear movement of the carriage (or tuning element) in either direction to a similar movement of the pointer but in a direction which is at right angles to the first mentioned direction.

While I have shown and described a preferred embodiment of my invention, it will be understood that various modifications and changes will occur to those skilled in the art without departing from the spirit and scope of this invention. I therefore contemplate by the appended claims to cover any such modifications as fall within the true spirit and scope of my invention.

What I claim is:

1. The combination, in radio apparatus, of an adjustable tuning element, a movable carrier for said tuning element, a turret provided with a plurality of stops, each individually adjustable to a position which determines a particular setting to which the tuning element is actuable, said turret being capable of both axial and rotary movements, means operable to move the tuning-element carried to a limiting position and simultaneously to move the turret in an axial direction, means coacting with the turret to convert the axial movement thereof to rotary movement whereupon in response to actuations of the carrier-moving means the turret is rotated step-by-step to successive positions at each of which a stop corresponding to the turret position is made effective, and means operable to move the tuning-element carrier from its limiting position to one at which it coacts with the then effective stop as determined by the next turret position whereby the tuning element is adjusted to the setting corresponding to said stop.

2. The combination defined in claim 1 wherein a switch is supported on the tuning-element carrier for short-circuiting the loudspeaker of said radio apparatus during movement of said carrier from one stop-position to the next.

3. The combination, in radio apparatus, of an adjustable tuning element, a movable carrier for said tuning element, a cylindrical turret provided with a plurality of circumferentially arranged stops, each individually adjustable axially of the turret to a position which determines a particular setting to which the tuning element is actuable, said turret being capable of both axial and rotary movements, means operable to move the tuning-element carrier to a limiting position and simultaneously to move the turret in an axial direction, means including a member carried on the turret and a member normally spaced therefrom, said members coacting to convert the axial movement of the turret to rotary movement whereupon in response to actuations of the carrier-moving means the turret is rotated step-by-step to successive positions at each of which a stop corresponding to the turret position is made effective, and means operable to move the tuning-element carrier from its limiting position to one at which it coacts with the then effective stop as determined by the next turret position whereby the tuning element is adjusted to the setting corresponding to said stop.

4. The combination defined in claim 3 wherein the member carried on the turret is an index wheel having as many spokes as there are turret stop-positions, and the other member is a lever pivoted on a fixed support which is arranged to coact with a spoke to cause the turret to be cammed to its next angular position.

5. The combination, in radio apparatus, of an adjustable tuning element, a reciprocable carrier for said tuning element, a multi-position rotatable turret provided with a plurality of stops, one for each turret position, said stops being individually adjustable axially of the turret each to a position which determines a particular setting to which the tuning element is actuable, actuating mechanism operable upon each actuation to withdraw the carrier from a previously adjusted setting and to impart linear motion to the turret, means for converting the linear motion of the turret to rotary motion whereby the turret is stepped to a position at which the stop corresponding to said position is made effective, and means operable to return the tuning element carrier to abut against the said effective stop whereby the tuning element is adjusted to the setting corresponding to said stop.

6. The combination, in radio apparatus, of an adjustable tuning element, a reciprocable carrier for said tuning element, a multi-position rotatable turret provided with a plurality of stops, one for each turret position, said stops being individually adjustable axially of the turret each to a position which determines a particular setting to which the tuning element is actuable, actuating mechanism operable upon each actuation to withdraw the carrier from a previously adjusted setting and to impart linear motion to the turret, an index wheel carried on the turret, a lever pivoted on a fixed support for engagement by the index wheel to convert the linear motion of the turret to rotary motion whereby the turret is stepped to a position at which the stop corresponding to said position is made effective, and means operable to return the tuning element carrier to abut against the said effective stop whereby the tuning element is adjusted to the setting corresponding to said stop.

7. The combination, in radio apparatus, of an adjustable tuning element, a carrier for said tuning element mounted for linear movement, a multi-position rotatable turret, the angular position of which determines the particular setting to which the tuning element is actuable, a shaft on which the turret is mounted arranged for axial and rotary movement, a stop-member for limiting the axial movement of the shaft and turret, actuating mechanism for the carrier and turret having a reciprocable member which, upon operation of the mechanism, actuates the tuning-element carrier and turret-shaft to their respective limiting positions, means movable with the turret and its shaft coacting with said stop-member, upon movement of the turret to its limit of axial movement, to cause rotation of the turret from one angular position to another, and means for effecting individual return travel of the reciprocable member, tuning-element carrier and turret away from their respective limiting positions.

8. The combination, in radio apparatus, of an adjustable tuning element, a movable carrier for said tuning element, a turret actuable to different angular settings provided with as many stops as there are settings, said stops being individually adjustable each to a position which determines the adjustment to which the tuning element is actuable, said turret being capable of both axial and rotary movements, means operable to move the tuning element carrier to a limiting position and simultaneously to move the turret in an axial direction, means operable in response to axial movement of the turret to cause the turret to be stepped to another angular setting at which the stop corresponding to said turret position is made effective, and means operable to move the tuning-element carrier from its limiting position to one whereat it coacts with the then effective stop whereby the tuning element is adjusted to the setting corresponding to said stop.

9. In automatic sequence tuning mechanism for radio apparatus of the type having a tuning element movable along a travel path to different positions for changing the tuning of the apparatus: a positioning turret having an axis, and rotatably and slidably mounted with respect to said axis; a set of positioning stops adjustably held on said turret in angularly displaced steps with respect to said axis; said turret being rotatable around said axis in corresponding steps to sequentially bring the individual stops to a position in the travel path of the tuning element to define a predetermined adjustable tuning position for said element, shift structure connected for axially sliding the turret first away from and then back to an axial rest position in response to an automatic tuning operation, said shift structure including mechanical elements connected to convert at least part of each axial to-and-fro turret movement into a step of turret rotation for removing one positioning stop from the travel path and replacing the removed stop with another to sequentially tune the apparatus, and guide structure positioned to assure that at all times between automatic tuning operations the turret is held in a properly indexed rotatory step position.

10. The combination defined in claim 9 wherein the shift structure comprises radially directed indexing spokes carried by the turret and corresponding in number to the number of stops, and a cam lever pivoted on a fixed support for sequential engagement with the individual spokes upon axial movement of the turret to cause the turret to be cammed to its next angular position.

11. The combination defined in claim 9 in which the guide structure comprises a plurality of equi-angularly spaced projections on the turret equal to the number of turret stop positions, and a fixed guide plate provided with an open-ended slot for individually receiving the successive projections as they axially return with the turret to the rest position, and holding the projections against rotation.

12. The combination defined in claim 9 in which the guide structure comprises a plurality of equi-angularly spaced projections on the turret equal to the number of turret stop positions, and a guide member pivotally held on a fixed support for sequentially engaging the individual projections and guiding the turret in its axial return movement toward its axial rest position.

13. The combination defined in claim 9 in which the guide structure comprises a plurality of equi-angularly spaced projections on the turret equal to the number of turret stop positions, and a guide member pivotally held on a fixed support for engaging the individual projections and guiding the turret in its axial return movement toward its axial rest position, and wherein one of the stops is connected as a manual tuning element, the corresponding projection is shaped differently from the others and a switch responsive to said specially shaped projection is connected in a visual indicator combination for actuation by said specially shaped projection and indicating when the mechanism is in manual tuning position.

14. The combination defined in claim 9 in which the guide structure comprises a plurality of equi-angularly spaced projections on the turret equal to the number of turret stop positions, a fixed guide plate provided with an open-ended slot for individually receiving the successive projections as they axially return with the turret to the rest position, and holding the projections against rotation, and a pawl member pivotally held on a fixed support for engaging the individual projections and guiding the turret in its axial return movement to a position at least adjacent the open-ended slot of the fixed guide plate.

15. In automatic tuning mechanism for radio apparatus of the type having a movable tuning element; a positioning turret rotatable step-by-step to angular settings at each of which there is a separate tuning element stop for positioning the tuning element; each of the stops being threadedly held on the turret for selectable adjustment to the desired stop position; one of the stops being connected as a manual tuning element and being held with thread of a greater pitch than the others to provide a more rapid travel of the associated stop for manually tuning the mechanism more readily.

16. The combination as defined by claim 9 in which the mechanical elements are connected to substantially complete the rotatory turret stepping during the first sliding movement of the turret away from its axial rest position.

17. In automatic sequence tuning mechanism for signal receiving apparatus: tuning structure movable along a tuning path to different position for changing the tuning of the apparatus; a positioning turret having an axis, and rotatably and slidably mounted with respect to said axis; a set of positioning stops adjustably held on said turret in angularly displaced steps with respect to said axis; said turret being rotatable around said axis in corresponding steps to sequentially bring the individual stops to a position in the tuning path to define a predetermined adjustable tuning position for said structure, shift structure connected for axially sliding the turret first away from and then back to an axial rest position in response to an automatic tuning operation, said shift structure including mechanical elements connected to convert at least part of each axial to-and-fro turret movement into a step of turret rotation for removing one positioning stop from the tuning path and replacing the removed stop with another to sequentially tune the apparatus, said shift structure including bias elements connected to urge the turret toward its rest position, and electrically energizable impelling structure connected to carry the turret away from its rest position.

18. The combination as defined by claim 17 in which the bias structure is also connected to hold the tuning structure against the individual positioning stops and the electrically energizable impelling structure is connected to withdraw the tuning structure from the individual stops as it carries the turret away from its rest position.

*19. In a tuner for tuning to a selected frequency of a plurality of radio frequencies, the combination of a movable frequency tuning element movable to various positions to tune corresponding frequencies, means to move said element for tuning purposes, a rotatable turret assembly including adjustable stop elements, mechanical means coupling said rotatable assembly to said movable frequency tuning element for movement therewith in the same direction of motion, arresting means comprising an element for engagement with said stop elements and at positions corresponding to various frequencies to be tuned, together with manual means to move said arresting element while so engaged with the said rotatable assembly to thereby move said element and the movable frequency tuning element for correction purposes, substantially as described.*

*20. A tuning drive mechanism for radio receivers and the like comprising in combination, a movable tuning control means, a main tuning drive shaft mechanically coupled for moving said means, a rotatable turret assembly mechanically coupled for movement in the same direction of motion as said movable tuning control means by actuation of said main tuning drive shaft, a series of adjustable stops carried by said member, each adapted to represent a predetermined broadcast frequency channel, a means for selecting said stops successively, and a vernier control means mechanically coupled for tuning within said channels by effecting movement of said stops thereby mechanically moving said main tuning drive shaft.*

*21. A tuning drive mechanism for radio receivers and the like comprising in combination, a movable tuning control means, a main tuning drive shaft mechanically coupled for moving said means, a rotatable turret assembly mechanically coupled for movement in the same direction of motion as said movable tuning control means by actuation of said main tuning drive shaft, a series of adjustable stops carried by said member, each adapted to represent a predetermined broadcast frequency channel, a means for selecting said stops successively, and a vernier control means mechanically coupled for tuning within said channels by effecting movement of a selected one of said stops thereby mechanically moving said movable tuning control means.*

*22. The combination, in tunable radio apparatus, of a multi-position rotatable turret, the angular setting of whcih determines the tuning of said radio apparatus, a pair of end plates for said turret, a plurality of turret elements spaced about the turret and supported between said end plates, and a spring plate provided with radially extending fingers which coact with said turret elements to spring press the elements against one end plate of said turret.*

*23. The combination as defined in claim 22 wherein the turret elements are rotatable screws having bearing portions at each end, and said end plates define holes in which said bearing portions are journalled for rotation.*

*24. The combination as defined in claim 22 wherein one of said end plates supports one end of said turret elements against circumferential or radial movement, and the spring plate spring presses the elements against said last mentioned end plate.*

*25. The combination, in tunable radio apparatus, of a multi-position rotatable turret, two end-plates for said turret, a plurality of circumferentially arranged tuning elements on said turret to bring about a predetermined adjustment for each turret position, bearing portions upon each end of said tuning elements, said end plates defining holes in which said bearing portions are supported, and a spring plate having radially-extending fingers which coact with the bearing portion upon one end of said tuning elements clamped at the center to one end plate to spring press the elements toward the other of said end plates.*

*26. In a tuner for tuning to a selected frequency of a plurality of radio frequencies, the combination of a movable frequency tuning element movable to various positions to tune corresponding frequencies, means to move said element for tuning purposes comprising a mechanical linkage, a rotatable turret assembly including adjustable stops coupled by said mechanical linkage to said movable frequency tuning element and movable therewith upon actuation of said mechanical linkage in the same direction of motion as the frequency tuning element, arresting means comprising an element for engagement with said adjustable stops at positions corresponding to various frequencies to be tuned, together with manual means to move said arresting element while so engaged with the said element to thereby move said element and the movable frequency tuning element for correction purposes, substantially as described.*

EDWARD J. SPERBER.

REFERENCES CITED

The following references are of record in the file of this patent:

UNITED STATES PATENTS

| Number | Name | Date |
|---|---|---|
| 137,074 | Hard | Mar. 23, 1873 |
| 1,167,179 | Hires | Jan. 4, 1916 |
| 2,242,055 | Cramer | May 13, 1941 |
| 2,310,720 | Wandrey | Feb. 9, 1943 |
| 2,342,691 | Plensler | Feb. 29, 1944 |
| 2,411,754 | Pifer et al. | Nov. 26, 1946 |
| 2,435,522 | Wagenknecht | Feb. 3, 1948 |